(12) United States Patent
Cai et al.

(10) Patent No.: US 11,346,200 B2
(45) Date of Patent: May 31, 2022

(54) METHOD AND SYSTEM FOR GUARANTEEING SAFETY OF OFFSHORE OIL WELL CONTROL EQUIPMENT

(71) Applicant: China University of Petroleum (East China), Qingdao (CN)

(72) Inventors: Baoping Cai, Qingdao (CN); Yonghong Liu, Qingdao (CN); Chao Yang, Qingdao (CN); Xiangdi Kong, Qingdao (CN); Yi Zhao, Qingdao (CN); Hongqi Xu, Hebei (CN); Xincheng Li, Shandong (CN); Yandong Chen, Hebei (CN); Renjie Ji, Qingdao (CN); Zengkai Liu, Qingdao (CN); Libing Liu, Hebei (CN); Rikui Zhang, Shandong (CN); Yuqian Yang, Shandong (CN); Shitang Liu, Shandong (CN); Xin Wei, Shandong (CN)

(73) Assignee: China University of Petroleum (East China), Qingdao (CN)

( * ) Notice: Subject to any disclaimer, the term of this patent is extended or adjusted under 35 U.S.C. 154(b) by 425 days.

(21) Appl. No.: 16/704,805

(22) Filed: Dec. 5, 2019

(65) Prior Publication Data
US 2020/0370408 A1    Nov. 26, 2020

(30) Foreign Application Priority Data
May 20, 2019    (CN) .......................... 201910417095.X (51) Int. Cl.
*E21B 44/00* (2006.01)
*G06N 5/04* (2006.01)
*G06N 7/00* (2006.01)

(52) U.S. Cl.
CPC .............. *E21B 44/00* (2013.01); *G06N 5/04* (2013.01); *G06N 7/005* (2013.01)

(58) Field of Classification Search
CPC ........... E21B 44/00; G06N 5/04; G06N 7/005
(Continued)

(56) References Cited

U.S. PATENT DOCUMENTS

2012/0118637 A1* 5/2012 Wang ...................... E21B 44/00
                                                                    700/29
2012/0215450 A1* 8/2012 Ashok ................ G05B 23/0262
                                                                    702/9

(Continued)

FOREIGN PATENT DOCUMENTS

CN    104899664 A   *   9/2015

OTHER PUBLICATIONS

Baoping Cai, "Using Bayesian networks in reliability evaluation for subsea blowout preventer control system,"2012, Reliability Engineering and System Safety, vol. 108, pp. 32-41. (Year: 2012).*

*Primary Examiner* — Mohammad Ali
*Assistant Examiner* — Joshua T Sanders
(74) *Attorney, Agent, or Firm* — Levine Bagade Han LLP (57) ABSTRACT

The present disclosure belongs to the field of marine engineering, and in particular relates to a method and system for guaranteeing the safety of offshore oil well control equipment. The method comprises: identifying the state of a main structure of the offshore oil well control equipment, identifying the state of a hydraulic control unit of offshore oil well control equipment, identifying the state of an electronic control unit of offshore oil well control equipment, predicting the state of the offshore oil well control equipment and making a real-time decision based on existing information; and the system for guaranteeing the safety of the offshore oil well control equipment comprises a state identification sub- (Continued)

system of a main structure, a state identification subsystem of the hydraulic control unit, a state identification subsystem of the electronic control unit and a state prediction and real-time decision subsystem.

7 Claims, 3 Drawing Sheets

(58) Field of Classification Search
USPC .......................................................... 700/275
See application file for complete search history.

(56) References Cited

U.S. PATENT DOCUMENTS

2012/0317058 A1* 12/2012 Abhulimen ............ G06N 20/00
706/2
2013/0124171 A1* 5/2013 Schuette ............. E21B 41/0092
703/2

* cited by examiner

METHOD AND SYSTEM FOR GUARANTEEING SAFETY OF OFFSHORE OIL WELL CONTROL EQUIPMENT

CROSS-REFERENCE TO RELATED APPLICATION

This application claims priority to Chinese patent application No. 201910417095X filed on May 20, 2019, entitled "Method and system for guaranteeing safety of offshore oil well control equipment," which is incorporated herein by reference in its entirety.

BACKGROUND

Technical Field

The present disclosure belongs to the field of marine engineering, and in particular relates to a method and a system for guaranteeing the safety of offshore oil well control equipment.

Description of the Related Art

With the deepening of a national marine strategy, offshore oil exploitation has become a key issue in the national oil strategy, and the development of the offshore oil equipment has provided technical support for the offshore oil strategy. At the same time, the oil spill in the Gulf of Mexico has sounded the alarm for us and the offshore oil drilling and exploitation accidents will have devastating consequences. Therefore, the exploitation of offshore oil requires highly reliable well control equipment and effective maintenance methods for the well control equipment. Offshore oil well control equipment generally consists of three modules: an electronic control system that processes and sends control commands, a hydraulic control system that provides main control pressure, and a system main body that performs the main tasks. The detection of well control equipment is usually performed by means of regular maintenance, that is, the submarine equipment is regularly hoisted to the drilling platform for testing relevant parameters, and the test parameters are analyzed to assess the state of the well control equipment.

The traditional maintenance method guarantees the safe operation of offshore oil well control equipment to a certain extent. However, the regular maintenance method fails to monitor the real-time status of the well control equipment, and it is difficult to make a real-time decision on the drilling process. In addition, pure method for assessing the current state does not fully determine the availability and life state of the equipment. Therefore, it is particularly important for a method for assessing and predicting the state of offshore oil well control equipment to make a real-time decision on the drilling process and a set of system for guaranteeing the safety of offshore oil well control equipment.

BRIEF SUMMARY

In order to overcome the defects of the prior art, the present disclosure provides a method and a system for guaranteeing the safety of an offshore oil well control equipment.

In order to achieve the object above, according to an aspect of the present disclosure, a method for guaranteeing the safety of the offshore oil well control equipment is provided, comprising five major steps: identifying the state of a main structure of the offshore oil well control equipment, identifying the state of a hydraulic control unit of the offshore oil well control equipment, identifying the state of a electronic control unit of the offshore oil well control equipment, predicting the state of the offshore oil well control equipment and making a real-time decision based on existing information.

The identifying the state of the main structure of the offshore oil well control equipment specifically comprises:

S101: obtaining states of nodes $V_{11}$, $V_{12}$ ... $V_{1a}$, $A_{11}$, $A_{12}$ ... $A_{1b}$, $C_{11}$, $C_{12}$ ... $C_{1c}$ at a characteristic value acquisition layer of the main structure of the offshore oil well control equipment by signal processing;

S102: obtaining the fault probabilities of corresponding components $F_{11}$, $F_{12}$, $F_{13}$, $F_{14}$ ... $F_{1m}$ using a forward-backward inference algorithm, based on an established Bayesian network; and S103: judging whether respective component is in a fault state according to an existing rule.

The identifying the state of the hydraulic control unit of the offshore oil well control equipment specifically comprises:

S201: obtaining corresponding states of nodes $A_{21}$, $A_{22}$ ... $A_{2d}$, $PT_{21}$, $PT_{22}$ ... $PT_{2e}$ at a characteristic value acquisition layer of the hydraulic control unit of the offshore oil well control equipment by signal processing;

S202: obtaining the fault probabilities of corresponding components $F_{21}$, $F_{22}$, $F_{23}$, $F_{24}$ ... $F_{2p}$ using a forward-backward inference algorithm, based on an established Bayesian network; and S203: judging whether the respective component is in a fault state according to an existing rule.

The identifying the state of the electronic control unit of offshore oil well control equipment specifically comprises:

S301: obtaining corresponding states of control information layers $C_{31}$, $C_{32}$ ... $C_{3f}$ at the electronic control unit of offshore oil well control equipment by signal processing;

S302: obtaining the fault probabilities of corresponding components $F_{31}$, $F_{32}$, $F_{33}$, $F_{34}$ ... $F_{3r}$ using a forward-backward inference algorithm, based on an established Bayesian network; and S303: judging whether the respective component is in a fault state according to an existing rule.

The predicting the state of the offshore oil well control equipment specifically comprises:

S401: obtaining the corresponding states of current state layers $F_{11}$, $F_{12}$ ... $F_{1m}$, $F_{21}$, $F_{22}$ ... $F_{2p}$, $F_{31}$, $F_{32}$ ... $F_{3r}$ of the offshore oil well control equipment by collecting state identification signals;

S402: predicting the fault probabilities of corresponding components $P_1$, $P_2$, $P_3$, $P_4$ ... $P_t$ using a forward-backward inference algorithm, based on an established Bayesian network; and S403: judging whether the respective component will have a fault within 24 hours according to an existing rule.

The making a real-time decision based on existing information specifically comprises:

S501: judging whether a fault occurs currently, making the panel display and performing shutdown for maintenance if there is the fault, and proceeding to the next step if not;

S502: judging whether there is a predicted fault, allowing the equipment continue to run if there is no predicted fault, and making the panel display and judging whether the predicted fault is a major fault if yes, S503: performing the shutdown for maintenance if the predicted fault is the major fault, and proceeding to the next step if not; and S504: repeating S501 to S504.

The offshore oil well control equipment comprises the main structure of the offshore oil well control equipment installed on a wellhead, the hydraulic control unit of the offshore oil well control equipment installed on a submarine main support, and the electronic control unit of offshore oil well control equipment installed in a driller room; the electronic control unit of offshore oil well control equipment is connected with the hydraulic control unit of the offshore oil well control equipment through waterproof cables; and the hydraulic control unit of the offshore oil well control equipment is connected with the main structure of the offshore oil well control equipment through hydraulic pipelines.

According to another aspect of the present disclosure, a system for guaranteeing the safety of the offshore oil well control equipment is provided, comprising a state identification subsystem of a main structure installed on the main structure of the offshore oil well control equipment, a state identification subsystem of a hydraulic control unit installed on the hydraulic control unit of the offshore oil well control equipment, a state identification subsystem of an electronic control unit installed on the electronic control unit of offshore oil well control equipment and a state prediction and real-time decision subsystem installed in the driller room.

The state identification subsystem of the main structure comprises a vibration sensor group of the main structure, an acoustic emission sensor group of the main structure, a corrosion potentiometer of the main structure, a corrosion signal characteristic value extraction unit of the main structure, an acoustic emission signal characteristic value extraction unit of the main structure, a vibration signal characteristic value extraction unit of the main structure, a state monitoring information fusion unit of the main structure, and a state identification unit of the main structure; the vibration sensor group of the main structure is connected with the main structure of the offshore oil well control equipment by adhesive; the acoustic emission sensor group of the main structure is connected with the main structure of the offshore oil well control equipment by adhesive; the corrosion potentiometer of the main structure is connected with the main structure of the offshore oil well control equipment by adhesive; the corrosion signal characteristic value extraction unit of the main structure is connected with the corrosion potentiometer of the main structure through signal lines; the acoustic emission signal characteristic value extraction unit of the main structure is connected with the acoustic emission sensor group of the main structure through signal lines; the vibration signal characteristic value extraction unit of the main structure is connected with the vibration sensor group of the main structure through signal lines; the state monitoring information fusion unit of the main structure is connected with the corrosion signal characteristic value extraction unit of the main structure, the acoustic emission signal characteristic value extraction unit of the main structure and the vibration signal characteristic value extraction unit of the main structure through signal lines, respectively; and the state identification unit of the main structure is connected with the state monitoring information fusion unit of the main structure through signal lines.

The state identification subsystem of the hydraulic control unit comprises an acoustic emission sensor group of the hydraulic control unit, a pressure signal characteristic value extraction unit of the hydraulic control unit, an acoustic emission signal characteristic value extraction unit of the hydraulic control unit, a state monitoring information fusion unit of the hydraulic control unit, and a state identification unit of the hydraulic control unit; the acoustic emission sensor group of the hydraulic control unit is connected with key valves in the hydraulic control unit of the offshore oil well control equipment by adhesive; the signal characteristic value extraction unit of the hydraulic control unit pressure is connected with pressure sensors in the hydraulic control unit of the offshore oil well control equipment through signal lines; the signal characteristic value extraction unit of the hydraulic control unit pressure is connected with the acoustic emission sensor group of the hydraulic control unit through signal lines; the state monitoring information fusion unit of hydraulic control unit is connected with the signal characteristic value extraction unit of the hydraulic control unit pressure and the signal characteristic value extraction unit of the hydraulic control unit pressure through signal lines, respectively; and the state identification unit of the hydraulic control unit is connected with the state monitoring information fusion unit of hydraulic control unit through signal lines.

The state identification subsystem of the electronic control unit comprises a signal collection unit of the electronic control unit, an information screening unit of the electronic control unit, and a state identification unit of the electronic control unit; a signal collection unit of the electronic control unit is connected with interfaces in the electronic control unit of offshore oil well control equipment through signal lines; the information screening unit of the electronic control unit is connected with the signal collection unit of the electronic control unit through signal lines; and the state identification unit of the electronic control unit is connected with the signal collection unit of the electronic control unit through signal lines.

The state prediction and real-time decision subsystem comprises a current state collection unit, an information fusion unit of the offshore oil well control equipment, a state prediction unit of the offshore oil well control equipment, a situation-based decision unit and an online display unit; the current state collection unit is connected with the state identification unit of the electronic control unit through signal lines, and is connected with the state identification unit of the hydraulic control unit and the state identification unit of the main structure through waterproof cables, respectively; the state prediction unit of the offshore oil well control equipment is connected with the current state collection unit through signal lines; the information fusion unit of the offshore oil well control equipment is connected with the current state collection unit and the state prediction unit of the offshore oil well control equipment through signal lines, respectively; the situation-based decision unit is connected with the information fusion unit of the offshore oil well control equipment through signal lines; and the online display unit is connected with the information fusion unit of the offshore oil well control equipment and the situation-based decision unit through signal lines, respectively.

Compared with the prior art, the present disclosure has beneficial effects that the real-time state of each component can be obtained by monitoring the state of different units of the offshore oil well control equipment, respectively; and the future state of respective component of the offshore oil well control equipment is obtained by predicting the future state of the offshore oil well control equipment, and thus the decisions are made in advance.

DESCRIPTION OF THE REFERENCE NUMBERS

101 offshore oil well control equipment
102 electronic control unit of offshore oil well control equipment
103 hydraulic control unit of offshore oil well control equipment
104 main structure of offshore oil well control equipment
201 state identification subsystem of main structure
202 state identification subsystem of hydraulic control unit
203 state identification subsystem of electronic control unit
204 state prediction and real-time decision subsystem
205 vibration sensor group of main structure
206 acoustic emission sensor group of main structure
207 corrosion potentiometer of main structure
208 corrosion signal characteristic value extraction unit of main structure
209 acoustic emission signal characteristic value extraction unit of main structure
210 vibration signal characteristic value extraction unit of main structure
211 state monitoring information fusion unit of main structure
212 state identification unit of main structure
213 acoustic emission sensor group of hydraulic control unit
214 pressure signal characteristic value extraction unit of hydraulic control unit
215 acoustic emission signal characteristic value extraction unit of hydraulic control unit
216 state monitoring information fusion unit of hydraulic control unit
217 state identification unit of hydraulic control unit
218 signal collection unit of electronic control unit
219 information screening unit of electronic control unit
220 state identification unit of electronic control unit
221 current state collection unit
222 information fusion unit of offshore oil well control equipment
223 state prediction unit of offshore oil well control equipment
224 situation-based decision unit
225 online display unit
S1 start S2 panel display
S3 panel display S4 continue to run
S5 shutdown and maintenance J1 fault occurs currently?
J2 is there a predicted fault?

DETAILED DESCRIPTION

According to an aspect of the present disclosure, a method for guaranteeing the safety of an offshore oil well control equipment is provided, comprising five major steps: identifying the state of a main structure 104 of offshore oil well control equipment, identifying the state of a hydraulic control unit of offshore oil well control equipment 103, identifying the state of an electronic control unit 102 of offshore oil well control equipment, predicting the state of the offshore oil well control equipment 101, and making a real-time decision based on existing information.

Figure 1:
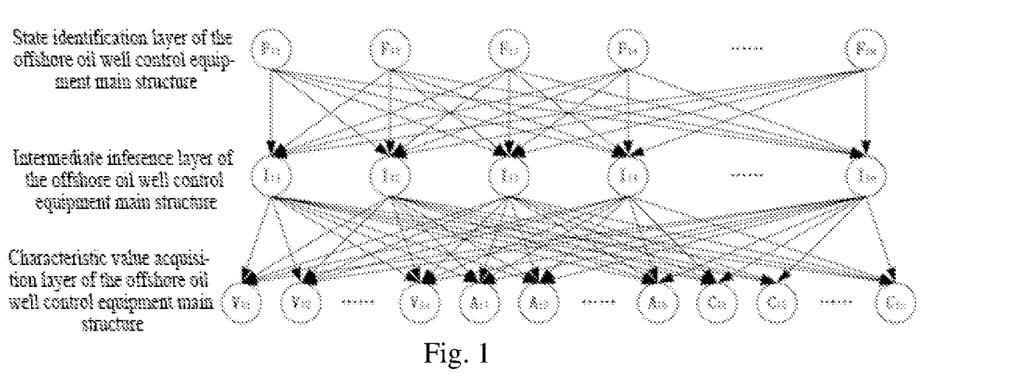
FIG. 1 is a schematic diagram showing a state identification algorithm for a main structure of an offshore oil well control equipment.

As shown in FIG. 1, the identifying the state of the main structure 104 of the offshore oil well control equipment specifically comprising:

S101: obtaining states of nodes $V_{11}$, $V_{12}$ ... $V_{1a}$, $A_{11}$, $A_{12}$ ... $A_{1b}$, $C_{11}$, $C_{12}$ ... $C_{1c}$ at a characteristic value acquisition layer of the main structure of the offshore oil well control equipment by signal processing, the corresponding states being $V_{11}(m_{11})$, $V_{12}(m_{12})$, ... $V_{1a}(m_{1a})$, $A_{11}(s_{11})$, $A_{12}(s_{12})$ ... $A_{1b}(s_{1b})$, $C_{11}(w_{11})$, $C_{12}(w_{12})$ ... $C_{1c}(w_{1c})$;

S102: obtaining the fault probabilities of corresponding components based on the Bayesian network as shown in FIG. 1, wherein for a component $F_{1x}$($x=1,2, \ldots$ m), the method for solving the fault probabilities is as follows:

$$P(F_{1x}) = \sum_{i=1}^{n} \sum_{j=1}^{y_{1i}} P(F_{1x} | I_{1i}(j)) P(I_{1i}(j) | V_{11}(m_{11}) \ldots V_{1a}(m_{1a}),$$
$$A_{11}(s_{11}) \ldots A_{1b}(s_{1b}), C_{11}(w_{11}) \ldots C_{1c}(w_{1c}))$$

wherein $P(F_{1x}|I_{1i}(j))$ represents the component indicated by the x-th node in the state identification layer of the main structure of the offshore oil well control equipment being in a fault state when the i-th node in an intermediate inference layer of the main structure of the offshore oil well control equipment is in a state j; $P(I_{1i}(j)|V_{11}(m_{11}) \ldots V_{1a}(m_{1a})$, $A_{11}(s_{11}) \ldots A_{1b}(s_{1b}), C_{11}(w_{11}) \ldots C_{1c}(w_{1c}))$ represents the probability at which the i-th node in the intermediate inference layer of the main structure of the offshore oil well control equipment is in the j-th state when the nodes $V_{11}$, $V_{12}$, ... $V_{1a}$, $A_{11}$, $A_{12}$ ... $A_{1b}$, $C_{11}$, $C_{12}$ ... $C_{1c}$ in the characteristic value acquisition layer of the main structure of the offshore oil well control equipment are in the states of $V_{11}(m_{11})$, $V_{12}(m_{12})$, ... $V_{1a}(m_{1a})$, $A_{11}(s_{11})$, $A_{12}(s_{12})$ ... $A_{1b}(s_{1b})$, $C_{11}(w_{11})$, $C_{12}(w_{12})$ ... $C_{1c}(w_{1c})$; $y_{1i}$ represents the number of states possessed by the i-th node in intermediate inference layer of the main structure of the offshore oil well control equipment; n represents the total number of nodes in the intermediate inference layer of the main structure of the offshore oil well control equipment; and the probability is obtained by existing database through statistics;

S103: judging whether respective component is in a fault state according to the following rule:

(1) the component is considered to be in a fault state when the fault probability is greater than 70%;

(2) the component is considered to have a potential fault when the fault probability is between 50% and 70%;

(3) the component is considered to be normal when the fault probability is less than 50%.

Figure 2:
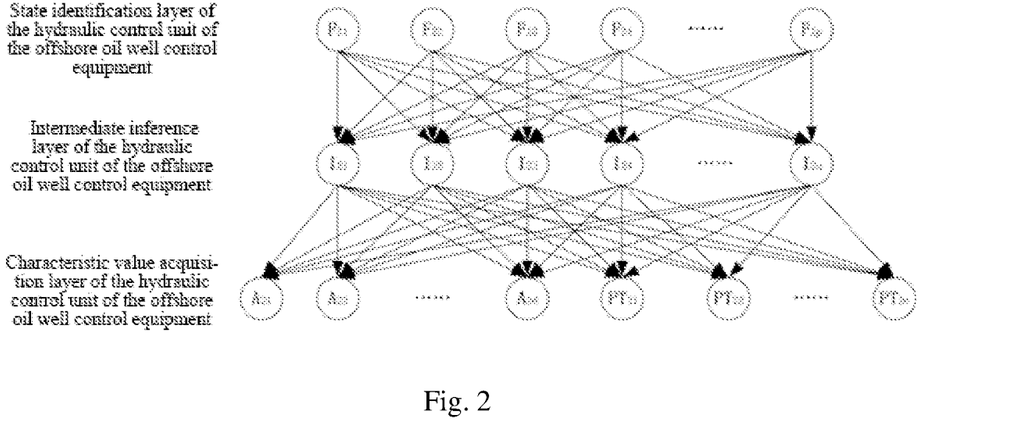
FIG. 2 is a schematic diagram showing a state identification algorithm for a hydraulic control unit of offshore oil well control equipment.

As shown in FIG. 2, the identifying the state of the hydraulic control unit 103 of the offshore oil well control equipment specifically comprises:

S201: obtaining corresponding states of nodes $A_{21}$, $A_{22}$ ... $A_{2d}$, $PT_{21}$, $PT_{22}$ ... $PT_{2e}$ at a characteristic value acquisition layer of the hydraulic control unit of the offshore oil well control equipment by signal processing, the corresponding states being $A_{21}(s_{21})$, $A_{22}(s_{22})$ ... $A_{2d}(s_{2d})$, $PT_{21}(w_{21})$, $PT_{22}(w_{22})$ ... $PT_{2e}(w_{2e})$;

S202: obtaining the fault probabilities of corresponding components based on the Bayesian network as shown in FIG. 2, wherein for a component $F_{2x}$(x=1,2, ... q), the method for solving the fault probabilities by changing p to q is as follows:

$$P(F_{2x}) = \sum_{i=1}^{q} \sum_{j=1}^{y_{2i}} P(F_{2x} \mid I_{2i}(j))$$

$$P(I_{2i}(j) \mid A_{21}(s_{21}) \ldots A_{2d}(s_{2d}), PT_{21}(w_{21}) \ldots PT_{2e}(w_{2e}))$$

wherein $P(F_{2x}|I_{2i}(j))$ represents the component indicated by the x-th node in the state identification layer of the hydraulic control unit of the offshore oil well control equipment being in a fault state when the i-th node in an intermediate inference layer of the hydraulic control unit of the offshore oil well control equipment is in a state j; $P(I_{2i}(j)|A_{21}(s_{21}) \ldots A_{2d}(s_{2d}),PT_{21}(w_{21}) \ldots PT_{2e}(w_{2e})$ represents the probability at which the i-th node in the characteristic value acquisition layer of the hydraulic control unit of the offshore oil well control equipment is in the j-th state when the nodes $A_{21} \ldots A_{2d}$, $PT_{21} \ldots PT_{2e}$ in the characteristic value acquisition layer of the hydraulic control unit of the offshore oil well control equipment are in the states of $A_{21}(s_{21}) \ldots A_{2d}(s_{2d})$, $PT_{21}(w_{21}) \ldots PT_{2e}(w_{2e})$; $y_{2i}$ represents the number of states possessed by the i-th node in intermediate inference layer of the hydraulic control unit of the offshore oil well control equipment; q represents the total number of nodes in the intermediate inference layer of the hydraulic control unit of the offshore oil well control equipment; and the conditional probability is obtained by existing database through statistics;

S203: judging whether the respective component is in a fault state according to the following rule:

(1) the component is considered to be in a fault state when the fault probability is greater than 70%;

(2) the component is considered to have a potential fault when the fault probability is between 50% and 70%;

(3) the component is considered to be normal when the fault probability is less than 50%.

Figure 3:
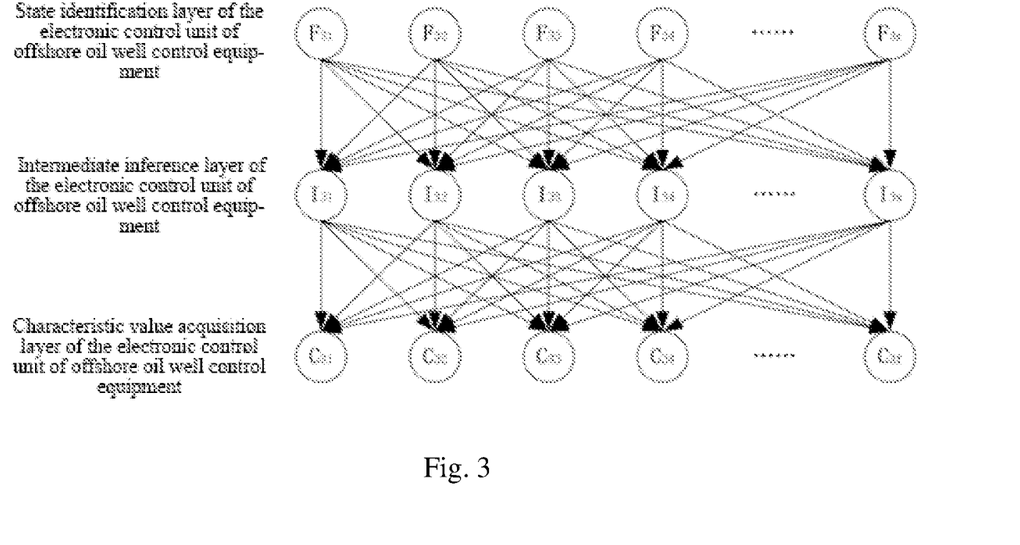
FIG. 3 is a schematic diagram showing a state identification algorithm for an electronic control unit of offshore oil well control equipment.

As shown in FIG. 3, the identifying the state of the electronic control unit 102 of offshore oil well control equipment specifically comprises:

S301: obtaining corresponding states of control information layers $C_{31}$, $C_{32}$ ... $C_{3f}$ of the electronic control unit of offshore oil well control equipment by signal processing, the corresponding states being $C_{31}(w_{31})$, $C_{32}(w_{32})$ ... $C_{3f}(w_{3f})$;

S302: obtaining the fault probabilities of corresponding components based on the Bayesian network as shown in FIG. 3, wherein for a component $F_{3x}$(x=1,2, ... r), the method for solving the fault probabilities is as follows:

$$P(F_{3x}) = \sum_{i=1}^{s} \sum_{j=1}^{y_{3i}} P(F_{3x} \mid I_{3i}(j))P(I_{3i}(j) \mid C_{31}(w_{31}), C_{32}(w_{32}) \ldots C_{3f}(w_{3f}))$$

wherein $P(F_{3x}|I_{3i}(j))$ represents the component indicated by the x-th node in the state identification layer of the electronic control unit of offshore oil well control equipment being in a fault state when the i-th node in an intermediate inference layer of the electronic control unit of offshore oil well control equipment is in a state j; $P(I_{3i}(j)|C_{31}(w_{31}),$ $C_{32}(w_{32}) \ldots C_{3f}(w_{3f}))$ represents the probability at which the i-th node in the intermediate inference layer of the electronic control unit of offshore oil well control equipment is in the j-th state when the nodes $C_{31}$, $C_{32}$ ... $C_{3f}$ in the control information layer of the electronic control unit of offshore oil well control equipment are in the states of $C_{31}(w_{31})$, $C_{32}(w_{32}) \ldots C_{3f}(w_{3f})$; y3i represents the number of states possessed by the i-th node in intermediate inference layer of the electronic control unit of offshore oil well control equipment; s represents the total number of nodes in the intermediate inference layer of the electronic control unit of offshore oil well control equipment; and the conditional probability is obtained by the existing database through statistics;

S303: judging whether the respective component is in a fault state according to the following rule:

(1) the component is considered to be in a fault state when the fault probability is greater than 70%;

(2) the component is considered to have a potential fault when the fault probability is between 50% and 70%;

(3) the component is considered to be normal when the fault probability is less than 50%.

Figure 4:
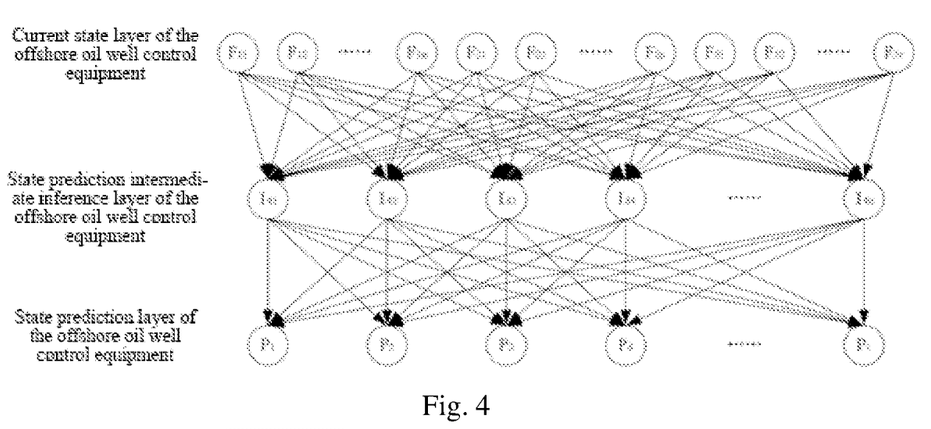
FIG. 4 is a schematic diagram showing a state prediction algorithm for the offshore oil well control equipment.
Figure 5:
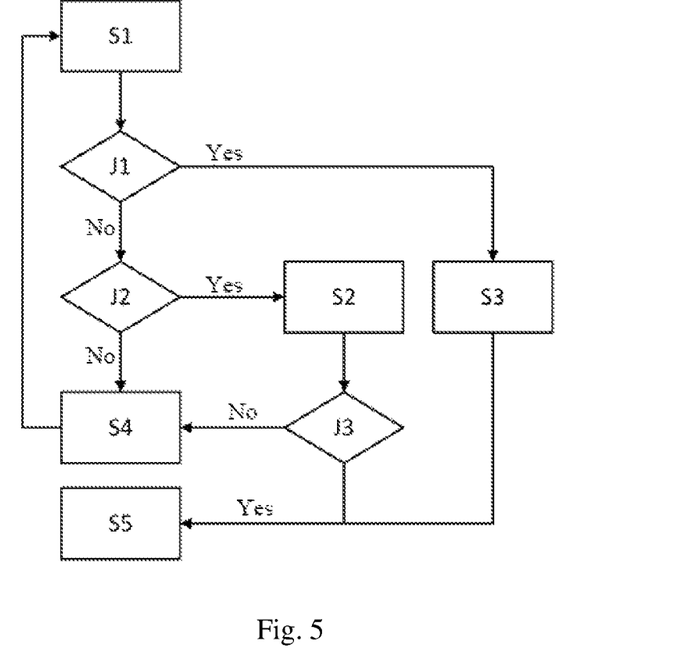
FIG. 5 is a schematic diagram showing a real-time decision method for the offshore oil well control equipment.

As shown in FIG. 4, the predicting the state of the offshore oil well control equipment 101 specifically comprising:

S401: obtaining the corresponding states of current state layers $F_{11}$, $F_{12}$ ... $F_{1m}$, $F_{21}$, $F_{22}$ ... $F_{2p}$, $F_{31}$, $F_{32}$ ... $F_{3r}$ of the offshore oil well control equipment by collecting state identification signals, the corresponding states being $F_{11}(z_{41})$, $F_{12}(z_{42})$ ... $F_{1m}(z_{4m})$, $F_{21}(u_{41})$, $F_{22}(u_{42})$ ... $F_{2p}(u_{4p})$, $F_{31}(v_{41})$, $F_{32}(v_{42})$ ... $F_{3r}(v_{4r})$;

S402: obtaining the predicted fault probabilities of corresponding components based on the Bayesian network as shown in FIG. 4, wherein for a component $P_{4x}$(x=1,2, ... t), the method for solving the predicted fault probabilities is as follows:

$$P(P_{4x}) = \sum_{i=1}^{u} \sum_{j=1}^{y_{4i}} P(P_{4x} \mid I_{4i}(j))P(I_{4i}(j) \mid F_{11}(z_{41}),$$

$$\ldots F_{1m}(z_{4m}), F_{21}(u_{41}), \ldots F_{2p}(u_{4p}), F_{31}(v_{41}), \ldots F_{3r}(v_{4r}))$$

wherein $P(P_{4x}|I_{4i}(j))$ represents the probability at which the component indicated by the x-th node in the state prediction layer of the offshore oil well control equipment will have a fault within the future certain time when the i-th node of the state prediction intermediate inference layer of the offshore oil well control equipment is in a state j, $P(I_{4i}(j)|F_{11}(z_{41}), \ldots F_{1m}(z_{4m}), F_{21}(u_{41}) \ldots F_{2p}(u_{4p}), F_{31}(v_{41}), \ldots F_{3r}(v_{4r})$ represents the probability at which the i-th node of the state prediction intermediate inference layer of the offshore oil well control equipment is in a state j when the nodes $F_{11}$, $F_{12}$ ... $F_{1m}$, $F_{21}$, $F_{22}$ ... $F_{2p}$, $F_{31}$, $F_{32}$ ... $F_{3r}$ in the current state layers of the offshore oil well control equipment are in states of $F_{11}(z_{41})$, $F_{12}(z_{42})$ ... $F_{1m}(z_{4m})$, $F_{21}(u_{41})$, $F_{22}(u_{42})$ ... $F_{2p}(u_{4p})$, $F_{31}(v_{41})$, $F_{32}(v_{42})$ ... $F_{3r}(v_{4r})$; $y_{4i}$ represents the number of states possessed by the i-th node in the state prediction intermediate inference layer of the offshore oil well control equipment; u represents the total number of nodes in the state prediction intermediate inference layer of the offshore oil well control equipment; and the conditional probability is obtained by expert decision;

S403: judging whether the respective component will have a fault within 24 hours according to the following rule;

(1) the component is considered to have high probability of the fault occurrence within 24 hours when the predicted fault probability is greater than 70%; and (2) the component is considered to have small probability of the fault occurrence within 24 hours when the predicted fault probability is less than 70%;

As shown in FIG. 5, the making a real-time decision based on existing information specifically comprises:

S501: judging whether a fault J1 occurs currently, making the panel display S3 and performing shutdown for maintenance S5 if there is the fault, and proceeding to the next step if not;

S502: judging whether there is a predicted fault J2, allowing the equipment continue to run S4 if there is no predicted fault, and making the panel display S2 and judging whether the predicted fault is a major fault J3 if yes, wherein a method for judging whether the predicted fault is a major fault is as follows:

(1) calculating the predicted fault weights by referring to the following formula:

$$\varepsilon_x = P(P_{4x}) \times \gamma_x$$

wherein $\varepsilon_x$ is a corresponding fault weight; $P(P_{4x})$ is the predicted fault probability of the x-th component in S402; $\gamma_x$ is the weight of the corresponding x-th component in the system and obtained by expert scoring;

(2) considering the predicted faults to be a major fault if the fault weight $\varepsilon_x$ is greater than 0.4;

S503: performing the shutdown for maintenance S5 if the predicted fault is the major fault, and proceeding to the next step if not; and S504: repeating S501 to S504.

Figure 6:
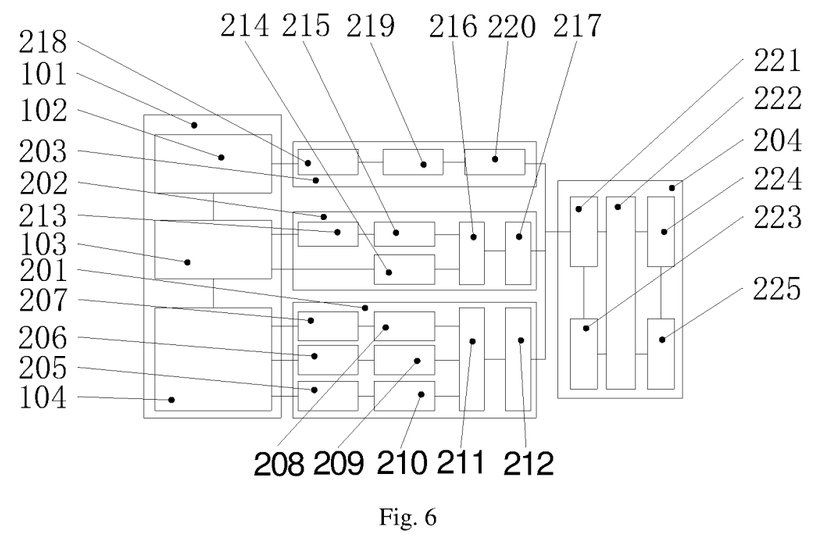
FIG. 6 is a schematic diagram showing a system for guaranteeing the safety of the offshore oil well control equipment.

As shown in FIG. 6, the offshore oil well control equipment 101 comprises a main structure 104 of the offshore oil well control equipment installed on a wellhead, a hydraulic control unit 103 of the offshore oil well control equipment installed on a submarine main support, and an electronic control unit 102 of offshore oil well control equipment installed in a driller room; the electronic control unit 102 of offshore oil well control equipment is connected with the hydraulic control unit 103 of the offshore oil well control equipment through waterproof cables, for collecting and displaying information in the sensors of the hydraulic control unit 103 of the offshore oil well control equipment and generating and processing control signals to control the corresponding hydraulic valves to achieve functions; the hydraulic control unit 103 of the offshore oil well control equipment is connected with main structure 104 of the offshore oil well control equipment through hydraulic pipelines, for controlling main structure 104 of the offshore oil well control equipment to produce corresponding actions; when the electronic control unit 102 of offshore oil well control equipment disposed in the driller room issues a control command, the corresponding valves in the hydraulic control unit 103 of the offshore oil well control equipment produces an action to control the hydraulic pressure to flow into corresponding functional components of main structure 104 of the offshore oil well control equipment to produce actions, thereby achieving the corresponding functions.

As shown in FIG. 6, according to another aspect of the present disclosure, a system for guaranteeing the safety of an offshore oil well control equipment is provided, comprising a state identification subsystem 201 of the main structure installed on main structure 104 of the offshore oil well control equipment, a state identification subsystem 202 of a hydraulic control unit installed on the hydraulic control unit 103 of the offshore oil well control equipment, an state identification subsystem 203 of the electronic control unit installed on the electronic control unit 102 of offshore oil well control equipment and a state prediction and real-time decision subsystem 204 installed in the driller room.

The state identification subsystem 201 of the main structure comprises a vibration sensor group 205 of a main structure, an acoustic emission sensor group 206 of a main structure, a corrosion potentiometer 207 of the main structure, a corrosion signal characteristic value extraction unit 208 of the main structure, an acoustic emission signal characteristic value extraction unit 209 of the main structure, a vibration signal characteristic value extraction unit 210 of the main structure, a state monitoring information fusion unit 211 of the main structure, and a state identification unit 212 of the main structure; the vibration sensor group 205 of the main structure is connected with main structure 104 of the offshore oil well control equipment by adhesive, for collecting vibration signals of the equipment body in real time; the acoustic emission sensor group 206 of the main structure is connected with main structure 104 of the offshore oil well control equipment by adhesive, for collecting acoustic emission signals of the equipment body in real time; the corrosion potentiometer 207 of the main structure is connected with main structure 104 of the offshore oil well control equipment by adhesive, for collecting corrosion signals of the equipment body in real time; the corrosion signal characteristic value extraction unit 208 of the main structure is developed based on DSP and connected with the corrosion potentiometer 207 of the main structure through signal lines, for receiving corrosion signals and extracting characteristic values; the main structure acoustic emission signal characteristic value extraction unit 209 is developed based on the DSP and connected with the acoustic emission sensor group 206 of the main structure through signal lines, for receiving acoustic emission signals and extracting characteristic values; the vibration signal characteristic value extraction unit 210 of the main structure is developed based on the DSP and connected with the vibration sensor group 205 of the main structure through signal lines, for receiving vibration signals and extracting characteristic values; the state monitoring information fusion unit 211 of the main structure is developed based on an STM32 data communication module and respectively connected with the corrosion signal characteristic value extraction unit 208 of the main structure, the acoustic emission signal characteristic value extraction unit 209 of the main structure and the vibration signal characteristic value extraction unit 210 of the main structure through signal lines, for fusing characteristic values of corrosion, acoustic emission and vibration signals and performing integration and transmission; and the state identification unit 212 of the main structure is developed based on the DSP, embedded with a Bayesian algorithm and connected with the state monitoring information fusion unit 211 of the main structure through signal lines, for identifying the state of the offshore oil well equipment main structure 104; the vibration sensor group 205 of the main structure, the acoustic emission sensor group 206 of the main structure, and the corrosion potentiometer 207 of the main structure bonded to main structure 104 of the offshore oil well control equipment collects corresponding signals for characterizing the state of the main structure 104 of the offshore oil well control equipment in real time; the vibration signal characteristic value extraction unit 210 of the main structure, the acoustic emission signal characteristic value extraction unit 209 of the main structure and the corrosion signal characteristic value extraction unit 208 of the main structure respectively process the corresponding signals to obtain the characteristic values and transmit them to the state identification unit 212 of the main structure through the state monitoring information fusion unit 211 of the main structure for identifying the current state of the main structure 104 of the offshore oil well control equipment and transmitting the identification results to the state prediction and real-time decision subsystem 204; and the state identification subsystem 201 of the main structure mainly completes the step for identifying the state of the main structure 104 of the offshore oil well control equipment.

The state identification subsystem 202 of the hydraulic control unit comprises an acoustic emission sensor group 213 of the hydraulic control unit, a signal characteristic value extraction unit 214 of a hydraulic control unit pressure, the signal characteristic value extraction unit 215 of the hydraulic control unit pressure, a state monitoring information fusion unit 216 of the hydraulic control unit, and a state identification unit 217 of the hydraulic control unit; the acoustic emission sensor group 213 of the hydraulic control unit is connected with key valves in the hydraulic control unit 103 of the offshore oil well control equipment by adhesive, for collecting acoustic emission signals of the key valves in real time; the signal characteristic value extraction unit 214 of the hydraulic control unit pressure is developed based on the DSP and connected with pressure sensors in the hydraulic control unit 103 of the offshore oil well control equipment through signal lines, for collecting pressure information and extracting characteristic values; the signal characteristic value extraction unit 215 of the hydraulic control unit pressure is developed based on the DSP and connected with the acoustic emission sensor group 213 of the hydraulic control unit through signal lines, for collecting acoustic emission signals and extracting characteristic values; the state monitoring information fusion unit 216 of the hydraulic control unit is developed based on the STM32 data communication module and respectively connected with the signal characteristic value extraction unit 214 of the hydraulic control unit pressure and the signal characteristic value extraction unit 215 of the hydraulic control unit pressure through signal lines, for fusing and transmitting the characteristic values of the acoustic emission signals and the characteristic values of the pressure signals; the state identification unit 217 of the hydraulic control unit is developed based on the DSP, embedded with a Bayesian algorithm and connected with the state monitoring information fusion unit 216 of the hydraulic control unit through signal lines, for identifying the state of the hydraulic control unit 103 of the offshore oil well control equipment; the signal characteristic value extraction unit 214 of the hydraulic control unit pressure and the signal characteristic value extraction unit 215 of the hydraulic control unit pressure are respectively used for obtaining the pressure sensor signals from the hydraulic control unit 103 of the offshore oil well control equipment and the acoustic emission signals from the acoustic emission sensor group 213 of the hydraulic control unit, extracting the characteristic values, and transmitting the characteristic values to the state identification unit 217 of the hydraulic control unit through the state monitoring information fusion unit 216 of the hydraulic control unit, to identify the current state of the hydraulic control unit 103 of the offshore oil well control equipment and transmit the identification results to the state prediction and real-time decision subsystem 204; and the state identification subsystem 202 of the hydraulic control unit mainly completes the step for identifying the state of the hydraulic control unit 103 of the offshore oil well control equipment.

The state identification subsystem 203 of the electronic control unit comprises a signal collection unit 218 of the electronic control unit, an information screening unit 219 of the electronic control unit, and a state identification unit 220 of the electronic control unit; a signal collection unit 218 of the electronic control unit is developed based on the STM32 data communication module and connected with interfaces in the electronic control unit 102 of offshore oil well control equipment through signal lines, for collecting control information of the electronic control system in real time; the information screening unit 219 of the electronic control unit is developed based on the DSP and connected with a signal collection unit 218 of the electronic control unit through signal lines, for processing and converting useful electronic control information; and the state identification unit 220 of the electronic control unit is developed based on the DSP, embedded with a Bayesian algorithm and connected with the information screening unit 219 of the electronic control unit through signal lines, for identifying the state of the electronic control unit 102 of offshore oil well control equipment; a signal collection unit 218 of the electronic control unit collects the signals of the electronic control unit 102 of offshore oil well control equipment and transmits the collected signals to the information screening unit 219 of the electronic control unit for being screened, the screened signals are transmitted to the state identification unit 220 of the electronic control unit which accesses the state of the electronic control unit 102 of offshore oil well control equipment and transmits the results to the state prediction and real-time decision subsystem 204; and the state identification subsystem 203 of the electronic control unit mainly completes the step for identifying the state of electronic control unit 102 of offshore oil well control equipment.

The state prediction and real-time decision subsystem 204 comprises a current state collection unit 221, an information fusion unit 222 of offshore oil well control equipment, a state prediction unit 223 of offshore oil well control equipment, a situation-based decision unit 224, and an online display unit 225; the current state collection unit 221 is developed based on a multi-channel signal collection board and connected with the state identification unit 220 of the electronic control unit through signal lines, and respectively connected with the state identification unit 217 of hydraulic control unit and the state identification unit 212 of the main structure through waterproof cables, for receiving and integrating current state information of the offshore oil well control equipment 101; the state prediction unit 223 of the offshore oil well control equipment is developed based on DSP, embedded with the Bayesian algorithm, and connected with the current state collection unit 221 through signal lines, for predicting the state of the offshore oil well control equipment 101; the information fusion unit 222 of the offshore oil well control equipment is developed based on the STM32 data communication module and respectively connected with the current state collection unit 221 and the state prediction unit 223 of the offshore oil well control equipment through signal lines, for fusing the current and predicted states of the offshore oil well control equipment 101; the situation-based decision unit 224 is developed based on the DSP data processing module, and connected with the information fusion unit 222 of the offshore oil well control equipment through signal lines, for making decisions on the related information; and the online display unit 225 is respectively connected with the information fusion unit 222 of the offshore oil well control equipment and the situation-based decision unit 224 through signal lines, for displaying the current state, the predicted state, and corresponding decision suggestions; and the current state collection unit 221 collects the current state information of the electronic control unit 102 of offshore oil well control equipment, the hydraulic control unit 103 of the offshore oil well control equipment and main structure 104 of the offshore oil well control equipment, respectively and transmits them to the state prediction unit 223 of the offshore oil well control equipment for predicting the state of the offshore oil well control equipment, the information fusion unit 222 of the offshore oil well control equipment collects the current information and the predicted information and transmits them to the situation-based decision unit 224, which makes decisions based on the current information and the predicted information, and the online display unit 225 displays the current information, predicted information and decision suggestions of the offshore oil control equipment 101 to the drillers; and the state prediction and real-time decision subsystem 204 mainly completes the step of predicting the state of the offshore oil control equipment 101 and the step of making a real-time decision based on the existing information.

The invention claimed is:

1. A method for guaranteeing the safety of an offshore oil well control equipment, comprising five major steps: identifying the state of a main structure of the offshore oil well control equipment, identifying the state of a hydraulic control unit of the offshore oil well control equipment, identifying the state of a electronic control unit of the offshore oil well control equipment, predicting the state of the offshore oil well control equipment and making a real-time decision based on existing information;

wherein the identifying the state of the main structure of the offshore oil well control equipment specifically comprises:

S101: obtaining states of nodes $V_{11}$, $V_{12}$ ... $V_{1a}$, $A_{11}$, $A_{12}$ ... $A_{1b}$, $C_{11}$, $C_{12}$ ... $C_{1c}$ at a characteristic value acquisition layer of the main structure of the offshore oil well control equipment by signal processing, the corresponding states being $V_{11}(m_{11})$, $V_{12}(m_{12})$, ... $V_{1a}(m_{1a})$, $A_{11}(s_{11})$, $A_{12}(s_{12})$ ... $A_{1b}(s_{1b})$, $C_{11}(w_{11})$, $C_{12}(w_{12})$ ... $C_{1c}(w_{1c})$;

S102: obtaining failure probabilities of corresponding components based on an established Bayesian network, wherein for a component $F_{1x}(x=1,2, \ldots m)$, a method for solving the fault probabilities is as follows:

$$P(F_{1x}) = \sum_{i=1}^{n} \sum_{j=1}^{y_{1i}} P(F_{1x} | I_{1i}(j)) P(I_{1i}(j) | V_{11}(m_{11}) \ldots V_{1a}(m_{1a}),$$

$$A_{11}(s_{11}) \ldots A_{1b}(s_{1b}), C_{11}(w_{11}) \ldots C_{1c}(w_{1c}))$$

wherein, $P(F_{1x}|I_{1i}(j))$ represents the component indicated by the x-th node in a state identification layer of the main structure of the offshore oil well control equipment being in a fault state when the i-th node in an intermediate inference layer of the main structure of the offshore oil well control equipment is in a state j; $P(I_{1i}(j)|V_{11}(m_{11}) \ldots V_{1a}(m_{1a}), A_{11}(s_{11}) \ldots A_{1b}(s_{1b}), C_{11}(w_{11}) \ldots C_{1c}(w_{1c}))$ represents the probability at which the i-th node in the intermediate inference layer of the main structure of the offshore oil well control equipment is in the j-th state when the nodes $V_{11}$, $V_{12}$, ... $V_{1a}$, $A_{11}$, $A_{12}$ ... $A_{1b}$, $C_{11}$, $C_{12}$ ... $C_{1c}$ in the characteristic value acquisition layer of the main structure of the offshore oil well control equipment are in the states of $V_{11}(m_{11})$, $V_{12}(m_{12})$, ... $V_{1a}(m_{1a})$, $A_{11}(s_{11})$, $A_{12}(s_{12})$ ... $A_{1b}(s_{1b})$, $C_{11}(w_{11})$, $C_{12}(w_{12})$ ... $C_{1c}(w_{1c})$; $y_{1i}$ represents the number of states possessed by the i-th node in the intermediate inference layer of the main structure of the offshore oil well control equipment; n represents the total number of nodes in the intermediate inference layer of the main structure of the offshore oil well control equipment; and a probability is obtained by existing database through statistics;

S103: judging whether the respective component is in a fault state according to the following rule:

(1) the component is considered to be in a fault state when the fault probability is greater than 70%;

(2) the component is considered to have a potential fault when the fault probability is between 50% and 70%;

(3) the component is considered to be normal when the fault probability is less than 50%;

the identifying the state of the hydraulic control unit of the offshore oil well control equipment specifically comprises:

S201: obtaining corresponding states of nodes $A_{21}$, $A_{22}$ ... $A_{2d}$, $PT_{21}$, $P_{22}$ ... $PT_{2e}$ at a characteristic value acquisition layer of the hydraulic control unit of the offshore oil well control equipment by signal processing, the corresponding states being $A_{21}(s_{21})$, $A_{22}(s_{22})$ ... $A_{2d}(s_{2d})$, $P_{21}(w_{21})$, $PT_{22}(w_{22})$ ... $PT_{2e}(w_{2e})$;

S202: obtaining fault probabilities of corresponding components based on an established Bayesian network, wherein for a component $F_{2x}(x=1,2, \ldots q)$, a method for solving the fault probabilities by changing p to q is as follows:

$$P(F_{2x}) = \sum_{i=1}^{q} \sum_{j=1}^{y_{2i}} P(F_{2x} | I_{2i}(j))$$

$$P(I_{2i}(j) | A_{21}(s_{21}) \ldots A_{2d}(s_{2d}), PT_{21}(w_{21}) \ldots PT_{2e}(w_{2e}))$$

wherein, $P(F_{2x}|I_{2i}(j))$ represents the component indicated by the x-th node in a state identification layer of the hydraulic control unit of the offshore oil well control equipment being in a fault state when the i-th node in an intermediate inference layer of the hydraulic control unit of the offshore oil well control equipment is in a state j; $P(I_{2i}(j)|A_{21}(s_{21}) \ldots A_{2d}(s_{2d}), PT_{21}(w_{21}) \ldots PT_{2e}(w_{2e}))$ represents the probability at which the i-th node in the characteristic value acquisition layer of the hydraulic control unit of the offshore oil well control equipment is in the j-th state when the nodes $A_{21}$ ... $A_{2d}$, $PT_{21}$ ... $PT_{2e}$ in the characteristic value acquisition layer of the hydraulic control unit of the offshore oil well control equipment are in the states of $A_{21}(s_{21})$ ... $A_{2d}(s_{2d})$, $PT_{21}(w_{21})$ ... $PT_{2e}(w_{2e})$; $y_{2i}$ represents the number of states possessed by the i-th node in the intermediate inference layer of the hydraulic control unit of the offshore oil well control equipment; q represents the total number of nodes in the intermediate inference layer of the hydraulic control unit of the offshore oil well control equipment; and the conditional probability is obtained by existing database through statistics;

S203: judging whether the respective component is in a fault state according to the following rule:
(1) the component is considered to be in a fault state when the fault probability is greater than 70%;
(2) the component is considered to have a potential fault when the fault probability is between 50% and 70%;
(3) the component is considered to be normal when the fault probability is less than 50%;
the identifying the state of the electronic control unit of offshore oil well control equipment specifically comprises:
S301: obtaining corresponding states of control information layers $C_{31}$, $C_{32}$ ... $C_{3f}$ of the electronic control unit of offshore oil well control equipment by signal processing, the corresponding states being $C_{31}(w_{31})$, $C_{32}(w_{32})$ ... $C_{3f}(w_{3f})$;
S302: obtaining fault probabilities of corresponding components based on an established Bayesian network, wherein for a component $F_{3x}$ (x=1,2, ... r), a method for solving the fault probabilities is as follows:

$$P(F_{3x}) = \sum_{i=1}^{s} \sum_{j=1}^{y_{3i}} P(F_{3x} | I_{3i}(j)) P(I_{3i}(j) | C_{31}(w_{31}), C_{32}(w_{32}) \ldots C_{3f}(w_{3f}))$$

wherein, $P(F_{3x}|I_{3i}(j))$ represents the component indicated by the x-th node in a state identification layer of the electronic control unit of offshore oil well control equipment being in a fault state when the i-th node in an intermediate inference layer of the electronic control unit of offshore oil well control equipment is in a state j; $P(I_{3i}(j)|C_{31}(w_{31}),C_{32}(w_{32}) \ldots C_{3f}(w_{3f}))$ represents the probability at which the i-th node in the intermediate inference layer of the electronic control unit of offshore oil well control equipment is in the j-th state when the nodes in the control information layer $C_{31}$, $C_{32}$ ... $C_{3f}$ of the electronic control unit of offshore oil well control equipment are in the states of $C_{31}(w_{31})$, $C_{32}(w_{32})$ ... $C_{3f}(w_{3f})$; $y_{3i}$ represents the number of states possessed by the i-th node in the intermediate inference layer of the electronic control unit of offshore oil well control equipment; s represents the total number of nodes in the intermediate inference layer of the electronic control unit of offshore oil well control equipment; and the conditional probability is obtained by the existing database through statistics;
S303: judging whether the respective component is in a fault state according to the following rule:
(1) the component is considered to be in a fault state when the fault probability is greater than 70%;
(2) the component is considered to have a potential fault when the fault probability is between 50% and 70%;
(3) the component is considered to be normal when the fault probability is less than 50%;
the predicting the state of the offshore oil well control equipment specifically comprises:
S401: obtaining corresponding states of current state layers $F_{11}$, $F_{12}$ ... $F_{1m}$, $F_{21}$, $F_{22}$ ... $F_{2p}$, $F_{41}$, $F_{32}$ ... $F_{3r}$ of the offshore oil well control equipment by collecting state identification signals, the corresponding states being $F_{11}(z_{41})$, $F_{12}(z_{42})$ ... $F_{1m}(z_{4m})$, $F_{21}(u_{41})$, $F_{22}(u_{42})$ ... $F_{2p}(u_{4p})$, $F_{31}(v_{41})$, $F_{32}(v_{42})$ ... $F_{3r}(v_{4r})$;
S402: obtaining predicted fault probabilities of corresponding components based on an established Bayesian network, wherein for a component $P_{4x}$ (x=1,2, ... t), a method for solving the predicted fault probabilities is as follows:

$$P(P_{4x}) = \sum_{i=1}^{u} \sum_{j=1}^{y_{4i}} P(P_{4x} | I_{4i}(j)) P(I_{4i}(j) | F_{11}(z_{41}),$$
$$\ldots F_{1m}(z_{4m}), F_{21}(u_{41}), \ldots F_{2p}(u_{4p}), F_{31}(v_{41}), \ldots F_{3r}(v_{4r}))$$

wherein, $P(P_{4x}|I_{4i}(j))$ represents the probability at which the component indicated by the x-th node in a state prediction layer of the offshore oil well control equipment will have a fault within a future certain time when the i-th node of a state prediction intermediate inference layer of the offshore oil well control equipment is in a state j; $P(I_{4i}(j)|F_{11}(z_{41}), \ldots F_{1m}(z_{4m}), F_{21}(u_{41}), \ldots F_{2p}(u_{4p}), F_{31}(v_{41}), \ldots F_{3r}(v_{4r}))$ represents the probability at which the i-th node of the state prediction intermediate inference layer of the offshore oil well control equipment is in the j-th state when the nodes $F_{11}$, $F_{12}$ ... $F_{1m}$, $F_{21}$, $F_{22}$ ... $F_{2p}$, $F_{31}$, $F_{32}$ ... $F_{3r}$ in the current state layers of the offshore oil well control equipment are in states of $F_{11}(z_{41})$, $F_{12}(z_{42})$ ... $F_{1m}(z_{4m})$, $F_{21}(u_{41})$, $F_{22}(u_{42})$ ... $F_{2p}(u_{4p})$, $F_{31}(v_{41})$, $F_{32}(v_{42})$ ... $F_{3r}(v_{4r})$; $y_{4i}$ represents the number of states possessed by the i-th node in the state prediction intermediate inference layer of the offshore oil well control equipment; u represents the total number of nodes in the state prediction intermediate inference layer of the electronic control unit of offshore oil well control equipment; and the conditional probability is obtained by expert decision;
S403: judging whether the respective component will have a fault within 24 hours according to the following rule;
(1) the component is considered to have high probability of the fault occurrence within 24 hours when the predicted fault probability is greater than 70%; and
(2) the component is considered to have small probability of the fault occurrence within 24 hours when the predicted fault probability is less than 70%;
the making a real-time decision based on existing information specifically comprises:
S501: judging whether a fault occurs currently, making panel display and performing shutdown for maintenance if there is the fault, and proceeding to the next step if not;
S502: judging whether there is a predicted fault, allowing the equipment continue to run if there is no predicted fault, and making the panel display and judging whether the predicted fault is a major fault if yes, wherein a method for judging whether the predicted fault is a major fault is as follows:
(1) calculating the predicted fault weights by referring to the following formula:

$$\varepsilon_x = P(P_{4x}) \times \gamma_x$$

wherein, $\varepsilon_x$ is a corresponding fault weight; $P(P_{4x})$ is the predicted fault probability of the x-th component in S402; $\gamma_x$ is corresponding weight of the x-th component in the system and obtained by expert scoring;

(2) considering the predicted fault to be a major fault if the fault weight $\varepsilon_x$ is greater than 0.4;

S503: performing the shutdown for maintenance if the predicted fault is the major fault, and proceeding to the next step if not; and S504: repeating S501 to S504.

2. A system for guaranteeing the safety of an offshore oil well control equipment implementing the method of claim 1, further comprising a state identification subsystem of a main structure installed on a main structure of the offshore oil well control equipment, a state identification subsystem of a hydraulic control unit installed on the hydraulic control unit of the offshore oil well control equipment, a state identification subsystem of an electronic control unit installed on the electronic control unit of the offshore oil well control equipment and a state prediction and real-time decision subsystem installed in a driller room.

3. A system for guaranteeing the safety of an offshore oil well control equipment, comprising:

a state identification subsystem of a main structure installed on a main structure of the offshore oil well control equipment, a state identification subsystem of a hydraulic control unit installed on the hydraulic control unit of the offshore oil well control equipment, a state identification subsystem of an electronic control unit installed on the electronic control unit of the offshore oil well control equipment and a state prediction and real-time decision subsystem installed in a driller room wherein the state identification subsystem of the main structure comprises a vibration sensor group of the main structure, an acoustic emission sensor group of the main structure, a corrosion potentiometer of the main structure, a corrosion signal characteristic value extraction unit of the main structure, an acoustic emission signal characteristic value extraction unit of the main structure, a vibration signal characteristic value extraction unit of the main structure, a state monitoring information fusion unit of the main structure, and a state identification unit of the main structure;

the vibration sensor group of the main structure is connected with the main structure of the offshore oil well control equipment by adhesive;

the acoustic emission sensor group of the main structure is connected with the main structure of the offshore oil well control equipment by adhesive;

the corrosion potentiometer of the main structure is connected with the main structure of the offshore oil well control equipment by adhesive;

the corrosion signal characteristic value extraction unit of the main structure is connected with the corrosion potentiometer of the main structure through signal lines;

the acoustic emission signal characteristic value extraction unit of the main structure is connected with the acoustic emission sensor group of the main structure through signal lines;

the vibration signal characteristic value extraction unit of the main structure is connected with the vibration sensor group of the main structure through signal lines;

the state monitoring information fusion unit of the main structure is connected with the corrosion signal characteristic value extraction unit of the main structure, the acoustic emission signal characteristic value extraction unit of the main structure and the vibration signal characteristic value extraction unit of the main structure through signal lines, respectively;

and the state identification unit of the main structure is connected with the state monitoring information fusion unit of the main structure through signal lines, wherein the corrosion signal characteristic value extraction unit of the main structure is developed based on DSP;

the acoustic emission signal characteristic value extraction unit of the main structure is developed based on the DSP;

the vibration signal characteristic value extraction unit of the main structure is developed based on the DSP;

the state monitoring information fusion unit of the main structure is developed based on an STM32 data communication module; the state identification unit of the main structure is developed based on the DSP and embedded with a Bayesian algorithm;

the signal characteristic value extraction unit of the hydraulic control unit pressure is developed based on the DSP;

the signal characteristic value extraction unit of the hydraulic control unit pressure is developed based on the DSP;

the state monitoring information fusion unit of hydraulic control unit is developed based on the STM32 data communication module;

the state identification unit of the hydraulic control unit is developed based on the DSP and embedded with a Bayesian algorithm;

a signal collection unit of the electronic control unit is developed based on the STM32 data communication module;

the signal collection unit of the electronic control unit is developed based on the DSP;

and the state identification unit of the electronic control unit is developed based on the DSP and embedded with a Bayesian algorithm;

the current state collection unit is developed based on a multi-channel signal collection board;

the state prediction unit of the offshore oil well control equipment is developed based on DSP and embedded with the Bayesian algorithm;

the information fusion unit of the offshore oil well control equipment is developed based on the STM32 data communication module;

and the situation-based decision unit is developed based on DSP data processing module.

4. The system for guaranteeing the safety of the offshore oil well control equipment of claim 3, wherein the state identification subsystem of the hydraulic control unit comprises an acoustic emission sensor group of the hydraulic control unit, a pressure signal characteristic value extraction unit of the hydraulic control unit, an acoustic emission signal characteristic value extraction unit of the hydraulic control unit, a state monitoring information fusion unit of the hydraulic control unit, and a state identification unit of the hydraulic control unit; the acoustic emission sensor group of the hydraulic control unit is connected with key valves in the hydraulic control unit of the offshore oil well control equipment by adhesive; the signal characteristic value extraction unit of the hydraulic control unit pressure is connected with pressure sensors in the hydraulic control unit of the offshore oil well control equipment through signal lines; the signal characteristic value extraction unit of the hydraulic control unit pressure is connected with the acoustic emission sensor group of the hydraulic control unit through signal lines; the state monitoring information fusion unit of hydraulic control unit is connected with the signal characteristic value extraction unit of the hydraulic control unit pressure and the signal characteristic value extraction unit of the hydraulic control unit pressure through signal lines, respectively; and the state identification unit of the hydraulic control unit is connected with the state monitoring information fusion unit of hydraulic control unit through signal lines.

5. The system for guaranteeing the safety of the offshore oil well control equipment of claim 3, wherein the state identification subsystem of the electronic control unit comprises a signal collection unit of the electronic control unit, an information screening unit of the electronic control unit, and a state identification unit of the electronic control unit; the signal collection unit of the electronic control unit is connected with interfaces in the electronic control unit of offshore oil well control equipment through signal lines; the information screening unit of the electronic control unit is connected with a signal collection unit of the electronic control unit through signal lines; and the state identification unit of the electronic control unit is connected with the signal collection unit of the electronic control unit through signal lines.

6. The system for guaranteeing the safety of the offshore oil well control equipment of claim 3, wherein the state prediction and real-time decision subsystem comprises a current state collection unit, an information fusion unit of the offshore oil well control equipment, a state prediction unit of the offshore oil well control equipment, a situation-based decision unit, and an online display unit; the current state collection unit is connected with state identification unit of the electronic control unit through signal lines, and is respectively connected with a state identification unit of the hydraulic control unit and a state identification unit of the main structure through waterproof cables; the state prediction unit of the offshore oil well control equipment is connected with the current state collection unit through signal lines; the information fusion unit of the offshore oil well control equipment is connected with the current state collection unit and the state prediction unit of the offshore oil well control equipment through signal lines, respectively; the situation-based decision unit is connected with the information fusion unit of the offshore oil well control equipment through signal lines; and the online display unit is connected with the information fusion unit of the offshore oil well control equipment and the situation-based decision unit through signal lines, respectively.

7. The system for guaranteeing the safety of the offshore oil well control equipment of claim 3, wherein the state identification subsystem of the main structure mainly completes step for identifying the state of the main structure of the offshore oil well control equipment; the state identification subsystem of the hydraulic control unit mainly completes step for identifying the state of the hydraulic control unit of the offshore oil well control equipment; a state identification subsystem of the electronic control unit mainly completes step for identifying the state of electronic control unit of offshore oil well control equipment; and the state prediction and real-time decision subsystem mainly completes step of predicting the state of the offshore oil control equipment and making a real-time decision based on existing information.

* * * * *